US012734083B2

(12) United States Patent
Choi et al.

(10) Patent No.: US 12,734,083 B2
(45) Date of Patent: Sep. 15, 2026

(54) SYSTEM AND METHOD FOR CONTROLLING WALKING ASSIST

(71) Applicants: Hyundai Motor Company, Seoul (KR); Kia Corporation, Seoul (KR)

(72) Inventors: Jong Kyu Choi, Yongin-si (KR); Ji Min Han, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 982 days.

(21) Appl. No.: 17/972,990

(22) Filed: Oct. 25, 2022

(65) Prior Publication Data

US 2023/0293368 A1 Sep. 21, 2023

(30) Foreign Application Priority Data

Mar. 18, 2022 (KR) ........................ 10-2022-0034258

(51) Int. Cl.

*A61G 5/14* (2006.01)
*A61G 5/04* (2013.01)
*A61H 3/00* (2006.01)

(52) U.S. Cl.

CPC ................. *A61G 5/14* (2013.01); *A61G 5/04* (2013.01); *A61H 3/00* (2013.01); *A61H 2230/625* (2013.01)

(58) Field of Classification Search

CPC .. A61G 5/14; A61G 5/1056–107; A61H 3/00; A61H 3/02; A61H 3/04; A61H 2003/043–046; A61H 2001/0211; A61H 2003/0216; A61H 1/0237–0262; G05B 2219/40305; B25J 9/0006

See application file for complete search history.

(56) References Cited

U.S. PATENT DOCUMENTS

| | | | | |
|---|---|---|---|---|
| 9,849,048 | B2 | 12/2017 | Borisoff et al. | |
| 11,096,847 | B2 | 8/2021 | Moore et al. | |
| 2015/0182408 | A1* | 7/2015 | Roh | B25J 9/0006 482/51 |
| 2015/0265490 | A1* | 9/2015 | Cestari Soto | A61H 3/04 297/5 |
| 2016/0324713 | A1* | 11/2016 | Halperin | A61H 1/0262 |

(Continued)

FOREIGN PATENT DOCUMENTS

| | | | | |
|---|---|---|---|---|
| CN | 211382258 U | * | 9/2020 | A61G 5/1067 |
| CN | 113041107 A | * | 6/2021 | A61G 5/14 |

(Continued)

OTHER PUBLICATIONS

EspaceNet Translation Bohyun KR_20190109183 (Year: 2019).*
EspaceNet Translation Lang CN_113041107 (Year: 2021).*
PE2E Translation Han CN_211382258_U_H (Year: 2020).*

*Primary Examiner* — Victoria Murphy
*Assistant Examiner* — Sydney Reyes Russell
(74) *Attorney, Agent, or Firm* — Slater Matsil, LLP

(57) ABSTRACT

An embodiment system for controlling walking assist includes a walking assist device worn by a user and an electric moving device configured to set a height of a grip of the electric moving device and a height of a seat of the electric moving device that allow seating of the walking assist device based on setting information received from the walking assist device and to set an operating speed of the electric moving device that corresponds to an operating speed of the walking assist device.

20 Claims, 16 Drawing Sheets

(56) References Cited

U.S. PATENT DOCUMENTS

| | | | | |
|---|---|---|---|---|
| 2019/0247264 | A1* | 8/2019 | Park | A61G 5/14 |
| 2019/0282431 | A1* | 9/2019 | Moore | A61G 5/04 |
| 2021/0056831 | A1* | 2/2021 | Visos-Ely | G01B 21/16 |
| 2021/0401644 | A1* | 12/2021 | Villarreal Suarez | A61G 5/041 |

FOREIGN PATENT DOCUMENTS

| | | | | | |
|---|---|---|---|---|---|
| JP | 4624200 | B2 | | 2/2011 | |
| JP | 2013085716 | A | | 5/2013 | |
| KR | 101398880 | B1 | | 5/2014 | |
| KR | 20190109183 | A | * | 9/2019 | A61H 3/00 |
| KR | 20200029069 | A | | 3/2020 | |

* cited by examiner

SYSTEM AND METHOD FOR CONTROLLING WALKING ASSIST

CROSS-REFERENCE TO RELATED APPLICATIONS

This application claims the benefit of Korean Patent Application No. 10-2022-0034258, filed on Mar. 18, 2022, which application is hereby incorporated herein by reference.

TECHNICAL FIELD

The present disclosure relates to a system and a method for controlling walking assist.

BACKGROUND

A walking assist device (robot) has been developed to assist the rehabilitation and the movement of patients having difficulty in walking for themselves. Recently, the walking assist device has been typically used for rehabilitation exercise in hospitals.

Meanwhile, an electric moving device (wheelchair) has been widely used, such that the patients having difficulty in walking move conveniently. Some electric moving devices have employed a function of moving up and down a grip and a function of tilting a seat to help the patients get on or off.

To more conveniently apply the walking assist device and the electric moving device to daily life, the walking assist device and the electric moving device have to be simultaneously controlled. However, recently, since the walking assist device and the electric moving device are individually controlled, it is difficult for patients, who are in the walking assist device, to control the electric moving device corresponding to the operation of the walking assist device.

SUMMARY

Embodiments of the present disclosure can solve problems occurring in the prior art while advantages achieved by the prior art are maintained intact.

An embodiment of the present disclosure provides a system and a method for controlling walking assist, capable of integrally controlling a walking assist device and an electric moving device.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a system for controlling walking assist may include a walking assist device worn by a user to assist walking of the user and an electric moving device to set heights of a grip and a seat of the electric moving device, which allow seating of the walking assist device, based on setting information received from the walking assist device, and to set an operating speed corresponding to an operating speed of the walking assist device.

The walking assist device may include an input device to receive setting information from the user and a controller to control a first leg part, a second leg part, and a third leg part.

The electric moving device may perform a control operation for a seating standby posture when receiving the setting information.

The electric moving device may set the height of the grip based on the length of the first leg part, the length of the second leg part, and the length of the third leg part, and set the height of the seat based on the length of the third leg part, such that the electric moving device may perform the control operation for the seating standby posture.

The electric moving device may determine whether the height of the grip and the height of the seat are the heights allowing the seating of the walking assist device when performing the control operation for the seating standby posture.

The electric moving device may reset the height of the grip and the height of the seat when determining the height of the grip and the height of the seat as being heights not allowing the seating of the walking assist device.

The electric moving device may perform a control operation for a seating start posture when determining the height of the grip and the height of the seat as being the heights allowing the seating of the walking assist device.

The electric moving device may perform the control operation for the seating start posture by tilting the seat, such that the walking assist device takes the seat.

The electric moving device may perform a control operation for a moving start posture when seating of the walking assist device is completed after the control for the seating start posture is completed.

The electric moving device may set a speed for controlling the electric moving device to be in the moving start posture to correspond to a speed for controlling seating of the walking assist device.

The electric moving device may control the height of the grip to be matched with a sum of the length of the first leg part and the length of the third leg part and may recover the tilting of the seat such that the electric moving device performs the control operation for the moving start posture.

The electric moving device may perform a control operation for a stand-up standby posture when a user input is made in a state that the electric moving device is in the moving start posture.

The electric moving device may set the height of the grip based on the length of the first leg part and the length of the third leg part and may set the height of the seat based on the length of the third leg part, such that the electric moving device may perform the control operation for the stand-up standby posture.

The electric moving device may determine whether the height of the grip and the height of the seat are the heights allowing the standing-up of the walking assist device when performing the control operation for the stand-up standby posture.

The electric moving device may reset the height of the grip and the height of the seat when determining the height of the grip and the height of the seat as being heights not allowing the standing-up of the walking assist device.

The electric moving device may perform a control operation for a stand-up standby posture when determining the height of the grip and the height of the seat as being heights allowing the standing-up of the walking assist device.

The electric moving device may set the height of the grip based on the length of the first leg part, the length of the second leg part, and the length of the third leg part and may perform the control operation for the stand-up standby posture by tilting the seat.

The electric moving device may reset the moving speed per step of the walking assist device when the moving speed is not matched by the walking speed of the walking assist device.

The electric moving device may set heights of a grip and a seat of the electric moving device, which allow seating of the walking assist device, based on body information of the user, and may set a moving speed to correspond to the moving speed of the walking assist device.

According to an embodiment of the present disclosure, the electric moving device may include a communication device to receive setting information of a user from a walking assist device and a controller to set heights of a grip and a seat, which allow seating of the walking assist device, based on setting information and to set an operating speed corresponding to an operating speed of the walking assist device.

According to an embodiment of the present disclosure, the walking assist device may include an input device to receive setting information of the user and a controller to control operations of a first leg part, a second leg part, and a third leg part to assist walking of the user, as the walking assist device is worn by the user.

According to another embodiment of the present disclosure, a method for controlling walking assist may include setting a height of a grip and a height of a seat, which allow seating of a walking assist device worn by a user to assist walking of the user, based on setting information received from the walking assist device, and setting an operating speed of an electric moving device corresponding to an operating speed of the walking assist device.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
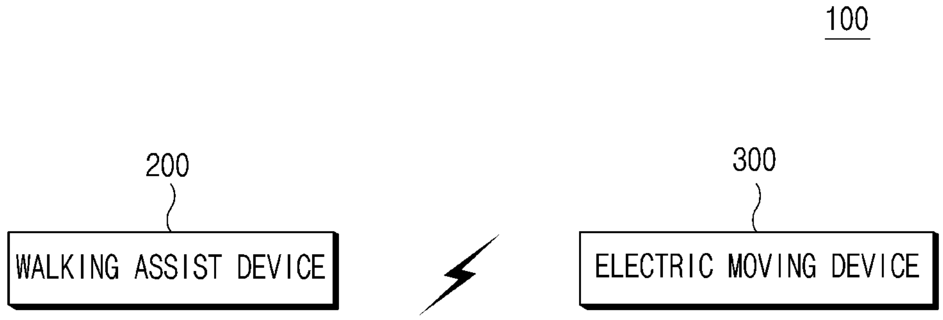
FIG. 1 is a view illustrating the configuration of a system for controlling walking assist, according to an embodiment of the present disclosure.

Hereinafter, some embodiments of the present disclosure will be described in detail with reference to the accompanying drawings. In adding the reference numerals to the components of each drawing, it should be noted that the identical or equivalent component is designated by the identical numeral even when it is displayed on other drawings. Further, in describing the embodiments of the present disclosure, a detailed description of well-known features or functions will be omitted in order not to unnecessarily obscure the gist of the present disclosure.

In addition, in the following description of components according to embodiments of the present disclosure, the terms ‘first’, ‘second’, ‘A’, ‘B’, ‘(a)’, and ‘(b)’ may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

FIG. 1 is a view illustrating the configuration of a system for controlling walking assist, according to an embodiment of the present disclosure.

As illustrated in FIG. 1, a system 100 for controlling walking assist may include a walking assist device 200 and an electric moving device 300.

The walking assist device 200 is worn by a user to assist the walking of the user. The details of the walking assist device 200 will be described later with reference to FIGS. 2, 4, and 5.

The electric moving device 300 may set the height of a grip and the height of a seat such that the walking assist device 200 takes the seat, based on setting information received from the walking assist device 200, and may set an operating speed thereof to correspond to the operating speed of the walking assist device 200. The electric moving device 300 may include an electric wheelchair. The details of the electric moving device 300 will be described later with reference to FIGS. 3 and 6.

Figure 2:
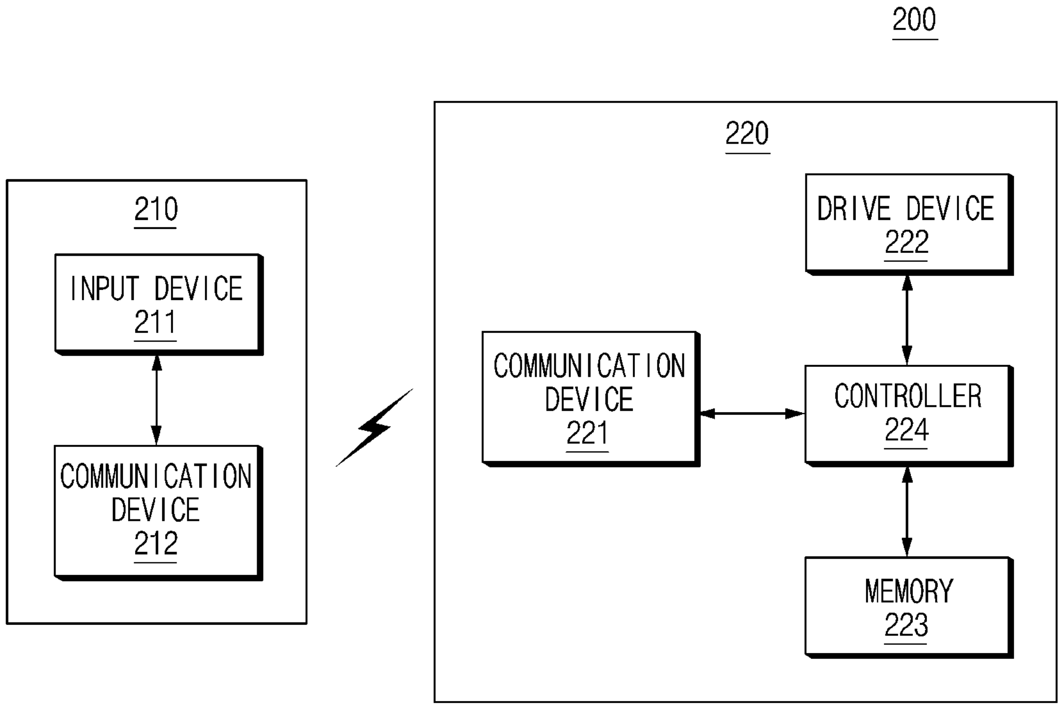
FIG. 2 is a view illustrating the configuration of a walking assist device, according to an embodiment of the present disclosure.
Figure 4:
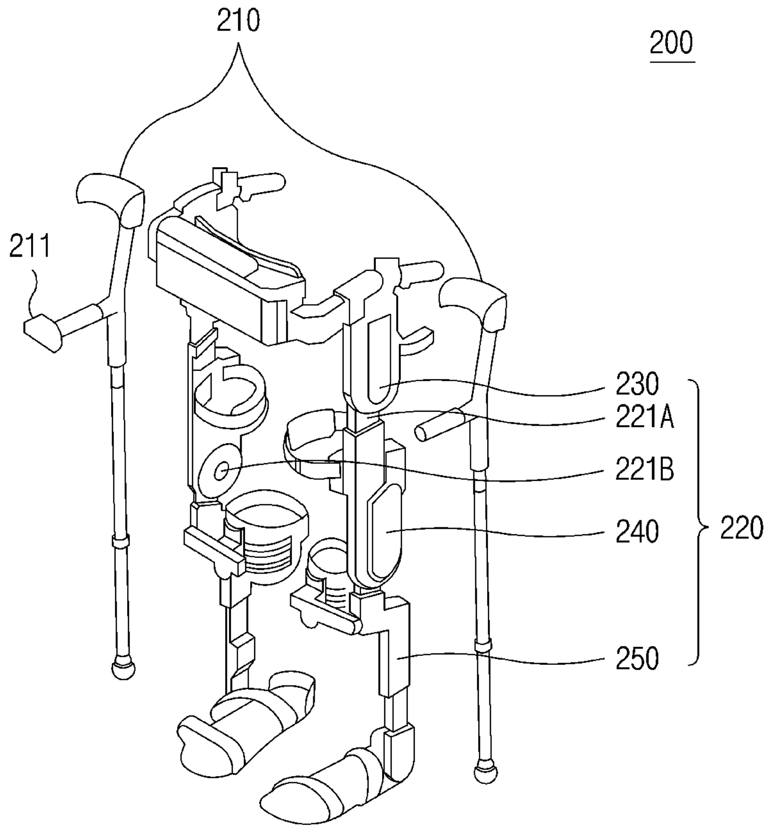
FIGS. 4 and 5 are views schematically illustrating a walking assist device, according to an embodiment of the present disclosure.
Figure 5:
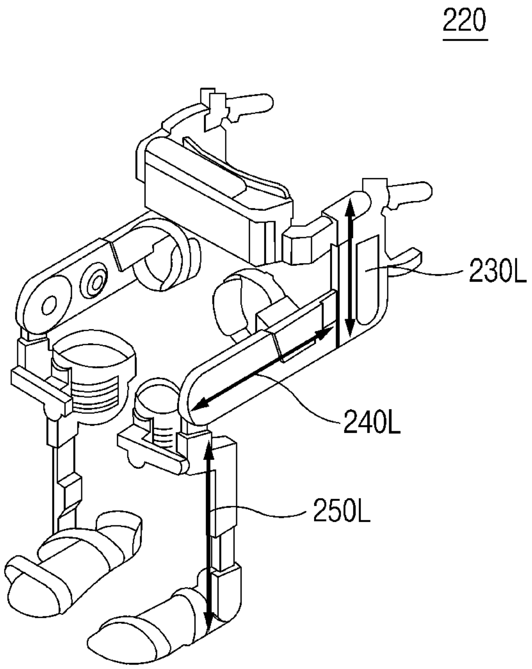

FIG. 2 is a view illustrating the configuration of a walking assist device, according to an embodiment of the present disclosure, and FIGS. 4 and 5 are views schematically illustrating a walking assist device, according to an embodiment of the present disclosure.

As illustrated in FIG. 2, the walking assist device 200 may include a first assist equipment 210 and a second assist equipment 220.

The first assist equipment 210 serves as a support to support a user, when the user being in the second assist equipment 220 walks. According to an embodiment, as illustrated in FIG. 4, the first assist equipment 210 may be implemented in the form of a stick.

According to an embodiment, the first assist equipment 210 may include an input device 211 to receive setting information of a user. The input device 211 may receive the setting information of the user, which includes body information, stride information, or a walking speed of the user. In addition, the first assist equipment 210 may include a communication device 212 to make wireless communication with the second assist equipment 220 and the electric moving device 300. The communication device 212 may transmit the setting information of the user, which is input into the input device 211, to the second assist equipment 220 and the electric moving device 300. The communication device 212 may make near-field communication with the second assist equipment 220 and the electric moving device 300, and may make Bluetooth communication, according to an embodiment.

The second assist equipment 220 may be implemented in the form which the user puts on. According to the embodiment, the second assist equipment 220 may be closely fixed to the lower body of the user to assist the walking of the user.

According to an embodiment, as illustrated in FIGS. 4 and 5, the second assist equipment 220 may include a first leg pall 230 corresponding to the pelvis of a user, a second leg part 240 corresponding to the thigh of the user, and a third leg pall 250 corresponding to the calf of the user. In addition, the second assist equipment 220 may include an upper joint part 221A to join the first leg part 230 with the second leg part 240, and a lower joint pall 221B to join the second leg part 240 with the third leg part 250. Accordingly, a length 230L of the first leg part 230 may correspond to the length of the pelvis of the user, a length 240L of the second leg part 240 may correspond to the length of the thigh of the user, and a length 250L of the third leg part 250 may correspond to the length of the calf of the user.

The second assist equipment 220 may include a communication device 221 to make near-field communication with the first assist equipment 210 and the electric moving device 300, a drive device 222 to drive the upper joint pall 221A and the lower joint part 221B under the control of a controller 224, a memory (i.e., a storage) 223 to store at least one algorithm to execute the operation of various instructions to operate the second assist equipment 220, and the controller 224 to control the operation of the second assist equipment 220.

According to an embodiment, the communication device 221 may make Bluetooth communication with the first assist equipment 210 and the electric moving device 300.

The memory 223 may include at least one storage medium of at least one of a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The controller 224 may be implemented by various processing devices, such as a microprocessor embedded therein with a semiconductor chip to operate or execute various instructions. The controller 224 may control the overall operation of the second assist equipment 220. According to an embodiment, the controller 224 may control the operations of the first leg part 230, the second leg part 240, and the third leg part 250 to assist the walking of the user. To this end, the controller 224 may control the operation of the drive device 222.

Figure 3:
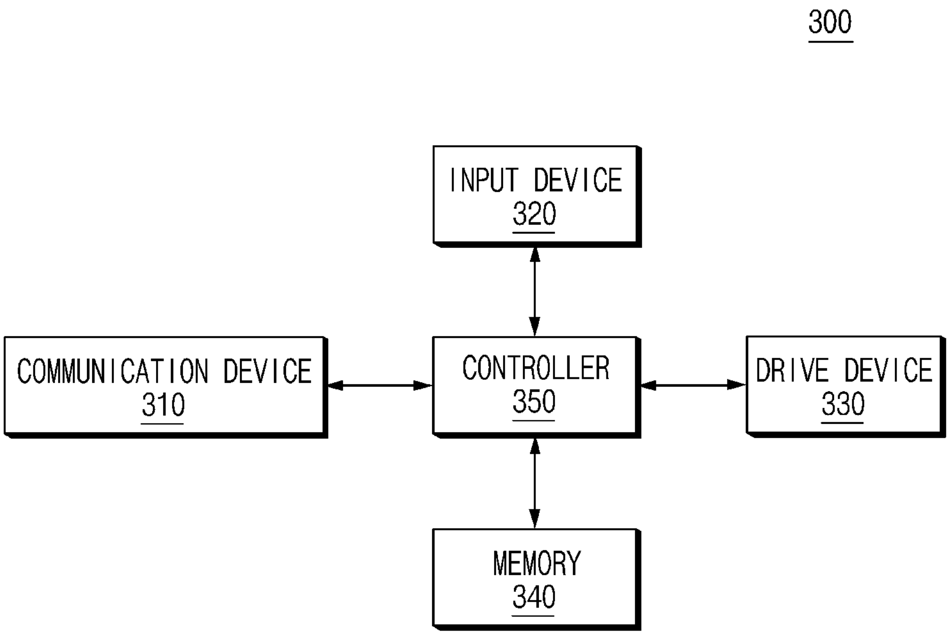
FIG. 3 is a view illustrating the configuration of an electric moving device, according to an embodiment of the present disclosure.
Figure 6:
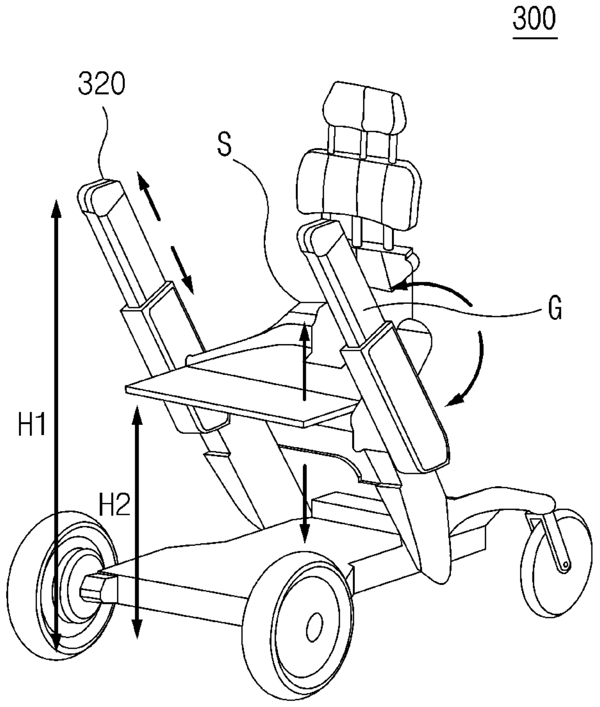
FIG. 6 is a view schematically illustrating an electric moving device, according to an embodiment of the present disclosure.

FIG. 3 is a view illustrating the configuration of an electric moving device, according to an embodiment of the present disclosure, and FIG. 6 is a view schematically illustrating an electric moving device, according to an embodiment of the present disclosure.

As illustrated in FIG. 3, the electric moving device 300 may include a communication device 310, an input device 320, a drive device 330, a memory (i.e., a storage) 340, and a controller 350.

The communication device 310 may make short-range wireless communication with the walking assist device 200. According to an embodiment, the communication device 310 may receive setting information of a user from the walking assist device 200 by making Bluetooth communication with the walking assist device 200.

The input device 320 may receive information on the operation of the electric moving device 300. In this case, the operation information may include the speed of the electric moving device 300, the height of the grip, and the height of the seat.

The drive device 330 may drive a wheel such that the electric moving device 300 may move under the control of the controller 350. In addition, depending on the received setting information, the drive device 330 may allow a grip 'G' to protrude out of a grip housing or to be retracted into the grip housing, may adjust the height of a seat 'S', or may tilt the seat 'S'.

The memory 340 may store at least one algorithm to operate or execute various instructions for the operation of the electric moving device 300. The memory 340 may include at least one storage medium of at least one of a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The controller 350 may be implemented by various processing devices, such as a microprocessor embedded therein with a semiconductor chip to operate or execute various instructions, and may control the overall operation of the electric moving device 300, according to an embodiment of the present disclosure.

As illustrated in FIG. 6, the controller 350 may make wireless communication with the walking assist device 200 to set the height 'H1' of the grip 'G' and the height 'H2' of the seat 'S' of the electric moving device 300, based on the setting information received from the walking assist device 200 and to set an operating speed corresponding to the operating speed of the walking assist device 200. In this case, the setting information received from the walking assist device 200 may include the length (including the length of the first leg part 230, the length of the second leg part 240, and the length of the third leg part 250) of a leg of the walking assist device 200, and body information (e.g., the length, which includes the length of the calf, the length of the thigh, and the length of the pelvis, of a leg of the user) of the user.

The grip 'G' may be controlled by the controller 350 to protrude out of the grip housing or be retracted into the grip housing, such that the grip 'G' is positioned at a position allowing a user to easily grip the grip 'G'. In addition, even the seat 'S' may be controlled by the controller 350 to be adjusted in height and to be tilted, such that the seat 'S' has a position allowing the user (being in the walking assist device 200) to easily take the seat 'S'.

The more detailed operation of the controller 350 will be described below with reference to FIGS. 7 to 12.

FIGS. 7 to 12 are views schematically illustrating the operation of an electric moving device, according to an embodiment of the present disclosure.

Figure 7:
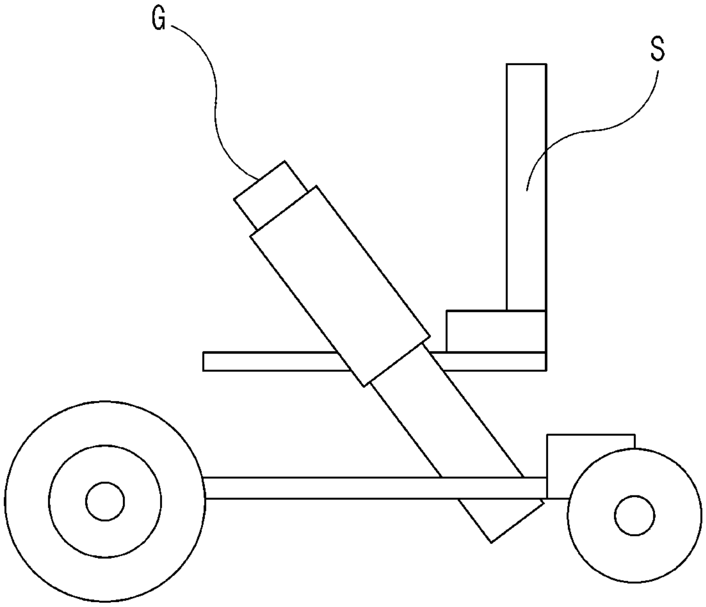
FIGS. 7 to 12 are views schematically illustrating the operation of an electric moving device, according to an embodiment of the present disclosure.

As illustrated in FIG. 7, when connected to the walking assist device 200 through the wireless communication to receive the setting information at an initial stage, the controller 350 may control the electric moving device 300 to be in a seating standby posture (see FIG. 8), based on the setting information, in an initial state of the electric moving device 300. In this case, the initial state may refer to the state of the grip 'G' and the seat 'S' of the electric moving device 300 before the grip 'G' and the seat 'S' are controlled based on the received setting information.

Figure 8:
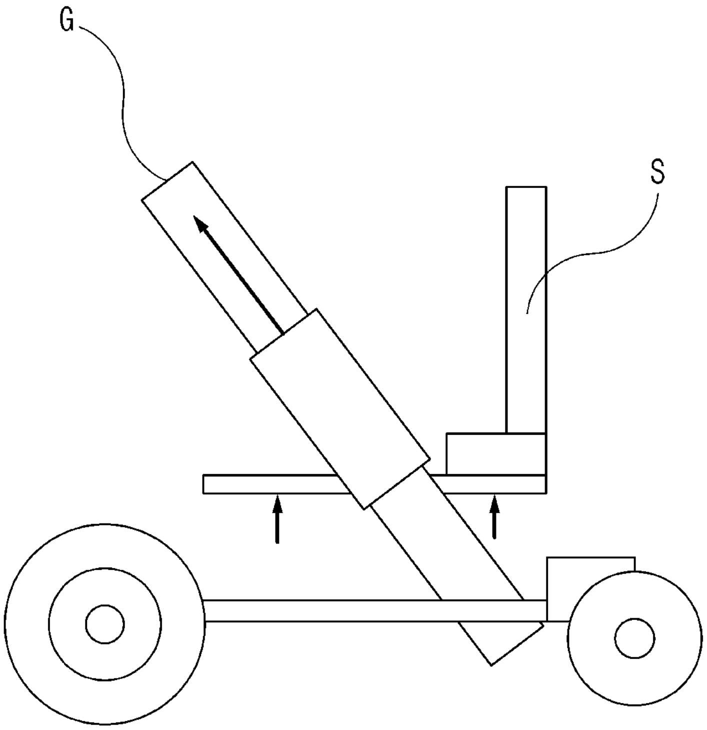

According to an embodiment, as illustrated in FIG. 8, the controller 350 may set the height of the grip 'G' and the height of the seat 'S', based on the length 230L of the first leg part 230, the length 240L of the second leg part 240, and the length 250L of the third leg part 250 (see FIG. 5). For example, the controller 350 may set the height of the grip 'G' to the sum of the length 230L of the first leg part 130, the length 240L of the second leg part 240, and the length 250L of the third leg part 250, and may control (drive) the grip 'G' to have the set height. In addition, the controller 350 may set the height of the seat 'S' to the length 250L of the third leg part 250, and may control (drive) the seat 'S' to have the set height of the seat 'S', such that the electric moving device 300 is in the seating standby posture.

When controlling the electric moving device 300 to be in the seating standby posture, the controller 350 may determine whether the height of the grip 'G' and the height of the seat 'S' are the heights allowing the seating of the walking assist device 200. According to an embodiment, the controller 350 may determine whether the height of the grip 'G' and the height of the seat 'S' are the heights allowing the seating of the walking assist device 200, based on the length (leg length) of the walking assist device 200, or the body information of the user.

The controller 350 may reset the height of the grip 'G' and the height of the seat 'S', when determining the height of the grip 'G' and the height of the seat 'S' as being the heights not allowing the seating of the walking assist device 200. The controller 350 may control the grip 'G' and the seat 'S' to have the reset heights of the grip 'G' and the seat 'S'. Accordingly, the controller 350 may continuously reflect information on the walking assist device 200 while controlling the electric moving device 300 to be in the optimal seating standby posture. Meanwhile, the controller 350 may control the electric moving device 300 to be in a seating start posture, when determining the height of the grip 'G' and the height of the seat 'S' as being the heights allowing the seating of the walking assist device 200 (see FIG. 9).

Figure 9:
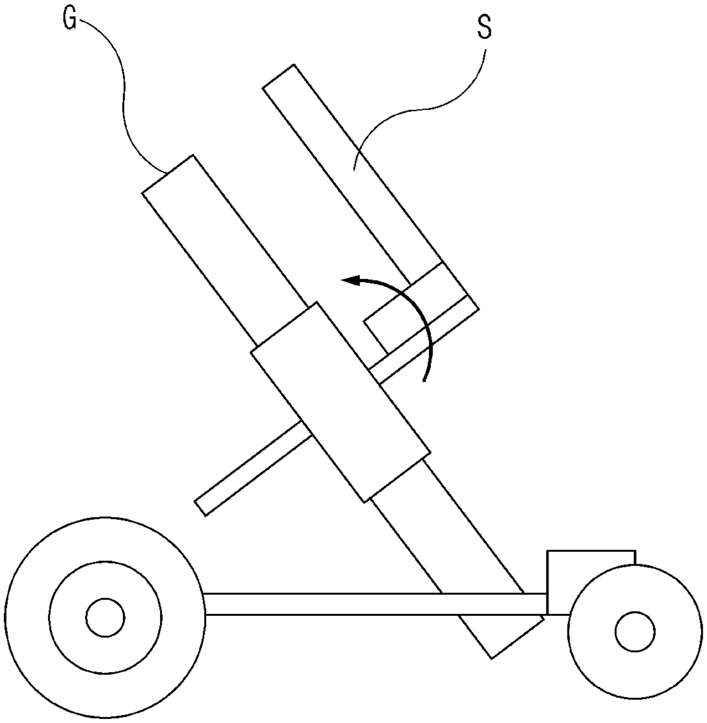

According to an embodiment, as illustrated in FIG. 9, the controller 350 may control the electric moving device 300 to be in a seating start posture by tilting the seat 'S', such that the walking assist device 200 easily takes the seat 'S' with the minimized impact, when the walking assist device 200 takes the seat 'S'.

The controller 350 may control the electric moving device 300 to be in a moving start posture, when the control operation for the seating start posture is completed. The controller 350 may determine, for the control operation for the moving start posture, whether the speed for controlling the seating of the walking assist device 200 is matched with the speed (including a speed for moving down the grip 'G' and a speed for recovering the tilting of the seat 'S') for controlling the electric moving device 300 to be in the moving start posture.

Figure 10:
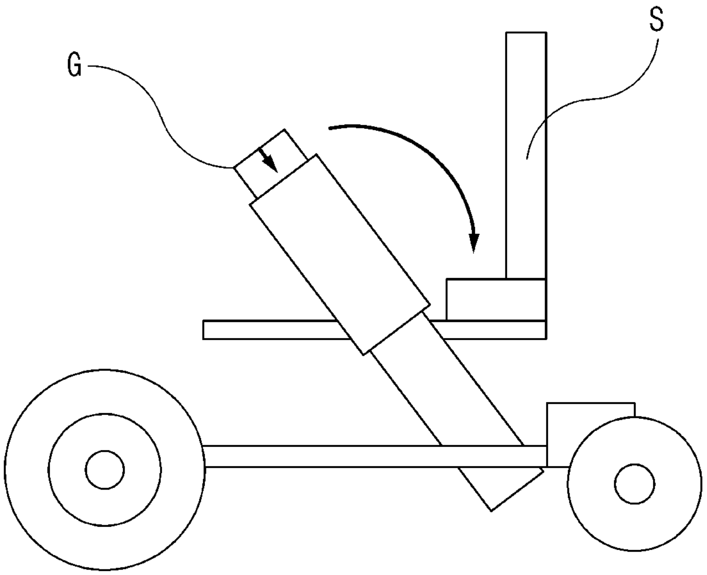

As illustrated in FIG. 10, the controller 350 may control the grip 'G' to the height of the grip 'G' in the moving start posture, and may control the tilting of the seat 'S' to be recovered, when the speed for controlling the seating of the walking assist device 200 is matched with the speed for controlling the electric moving device 300 to be in the moving start posture. In this case, the height of the grip 'G' in the moving start posture may be the height of the grip 'G' in the initial state.

Meanwhile, the controller 350 may reset the speed (driving speed) for controlling the electric moving device 300 to be in the moving start posture to correspond to the speed for controlling the seating of the walking assist device 200, when the speed for controlling the seating of the walking assist device 200 is mismatched from the speed for controlling the electric moving device 300 to be in the moving start posture. For example, the controller **35*o* may reset the speed for moving down the grip 'G' and the speed for recovering the tilting of the seat 'S' to correspond to the speed for controlling the seating of the walking assist device 200. In this case, the speed for moving down the grip 'G' may correspond to the speed for moving the second leg part 240 of the walking assist device 200**, as the seat 'S' is tilted.

The controller **35*o* may control the electric moving device 300 to be in a stand-up standby posture (see FIG. ii), when a user input is present in the state that the electric moving device 300** is in the moving start posture. In this case, the user input may be interpreted as a user input for standing up.

Figure 11:
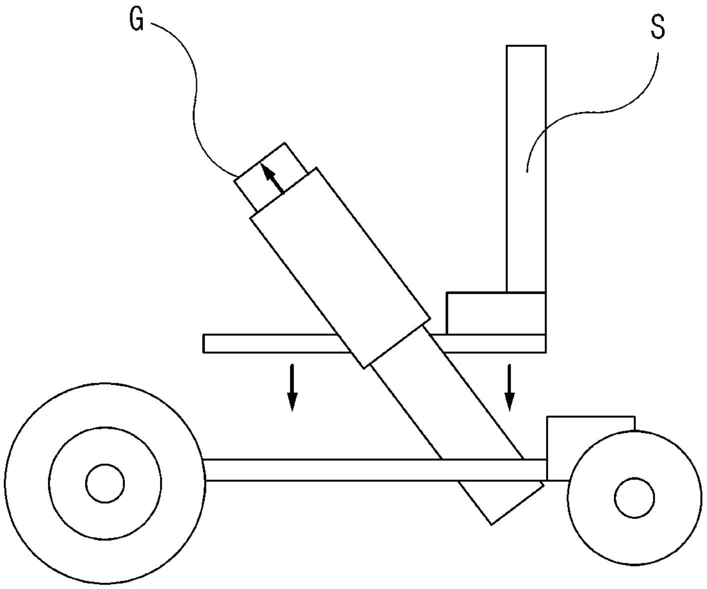

For example, as illustrated in FIG. 11, the controller 350 may set the height of the grip 'G' to the sum of the length 230L of the first leg pall 130 and the length 250L of the third leg part 250 (see FIG. 5), and may control (drive) the grip 'G' to have the set height. In addition, the controller 350 may set the height of the seat 'S' to the length 250L of the third leg part 250 and may control (drive) the seat 'S' to have the set height of the seat 'S', such that the electric moving device 300 is in the stand-up standby posture.

When controlling the electric moving device 300 to be in the stand-up standby posture, the controller 350 may determine whether the height of the grip 'G' and the height of the seat 'S' are the heights allowing the standing-up of the walking assist device 200. According to an embodiment, the controller 350 may determine whether the height of the grip 'G' and the height of the seat 'S' are the heights allowing the standing-up of the walking assist device 200, based on the length (leg length) of the walking assist device 200 or the body information of the user.

The controller 350 may reset the height of the grip 'G' and the height of the seat 'S', when determining the height of the grip 'G' and the height of the seat 'S' as being the heights not allowing the standing-up of the walking assist device 200. The controller 350 may control the grip 'G' and the seat 'S' to have the reset heights of the grip 'G' and the seat 'S'. Accordingly, the controller 350 may continuously reflect information on the walking assist device 200 while controlling the electric moving device 300 to be in the optimal stand-up standby posture.

Figure 12:
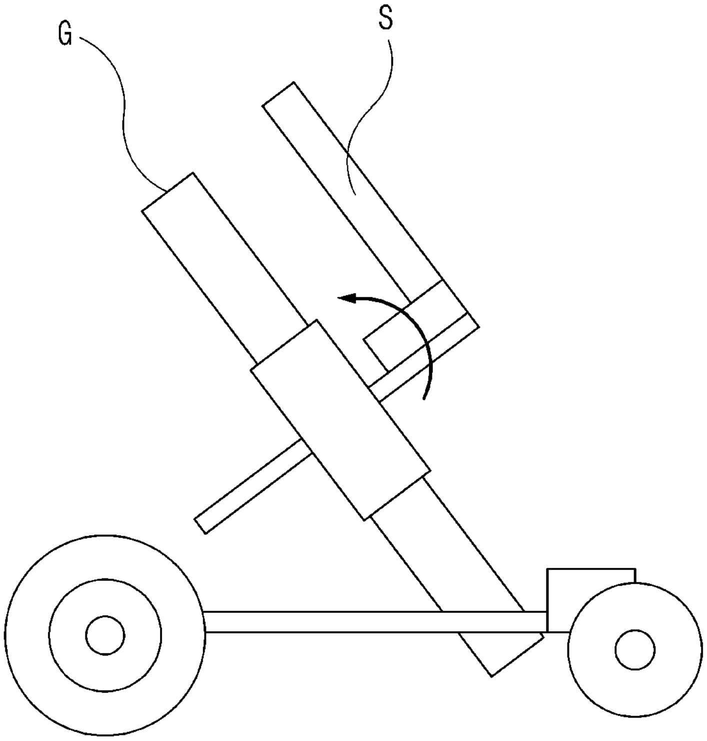

Meanwhile, the controller 350 may control the electric moving device 300 to be in a stand-up start posture, when determining the height of the grip 'G' and the height of the seat 'S' as being the heights allowing the standing-up of the walking assist device 200 (see FIG. 12). According to an embodiment, as illustrated in FIG. 12, the controller 350 may control the electric moving device 300 to be in the stand-up start posture by tilting the seat 'S', such that the walking assist device 200 easily stands up.

The controller 350 may determine whether the speed for controlling the standing-up of the walking assist device 200 is matched with the speed (including a speed for moving up the grip 'G' and a speed for tilting the seat 'S') for controlling the electric moving device 300 to be in the stand-up start posture, when performing the control operation for the stand-up start posture.

As illustrated in FIG. 12, the controller 350 may control the grip 'G' to be moved up to the height of the grip in the stand-up start posture, and may tilt the seat 'S', when the speed for controlling the standing-up of the walking assist device 200 is matched with the speed for controlling the electric moving device 300 to be in the stand-up start posture. In this case, the height of the grip 'G' in the stand-up start posture may be set based on the length 230L of the first leg part 230, the length 240L of the second leg part 240, and the length 250L of the third leg part 250 (see FIG. 5). For example, the controller 350 may set the height of the grip 'G' to the sum of the length 230L of the first leg part 230, the length 240L of the second leg part 240, and the length 250L of the third leg part 250, and may control (drive) the grip 'G' to have the set height.

Meanwhile, the controller 350 may reset the speed (driving speed) for controlling the electric moving device 300 to be in the stand-up start posture to correspond to the speed for controlling the standing-up of the walking assist device 200 when the speed for controlling the standing-up of the walking assist device 200 is mismatched from the speed for controlling the electric moving device 300 to be in the stand-up start posture. For example, the controller 350 may reset the speed for moving up the grip 'G' and the speed for tilting the seat 'S' to correspond to the speed for controlling the standing-up of the walking assist device 200. In this case, the speed for moving up the grip 'G' may correspond to the speed for moving the second leg part 240 of the walking assist device 200, as the seat 'S' is tilted.

According to embodiments of the present disclosure, the controller 350 may receive information on the length of the stride and the moving distance per second from the walking assist device 200 and control a moving speed based on the received information.

According to an embodiment, when the walking assist device 200 starts walking, the controller 350 may determine whether the walking speed of the walking assist device 200 is matched with the moving speed.

The controller 350 may request the walking assist device 200 to maintain the walking thereof, when the walking speed of the walking assist device 200 is determined as being matched with the moving speed. Meanwhile, the controller 350 may change the moving speed, based on a walking speed per step of the walking assist device 200, and may perform a control operation to move at a changed speed, when the walking speed of the walking assist device 200 is determined as being mismatched from the moving speed. Accordingly, the controller 350 may allow the electric moving device 300 to serve as a walker, when the walking assist device 200 walks, and allow the electric moving device 300 to follow the walking assist device 200.

Figure 13:
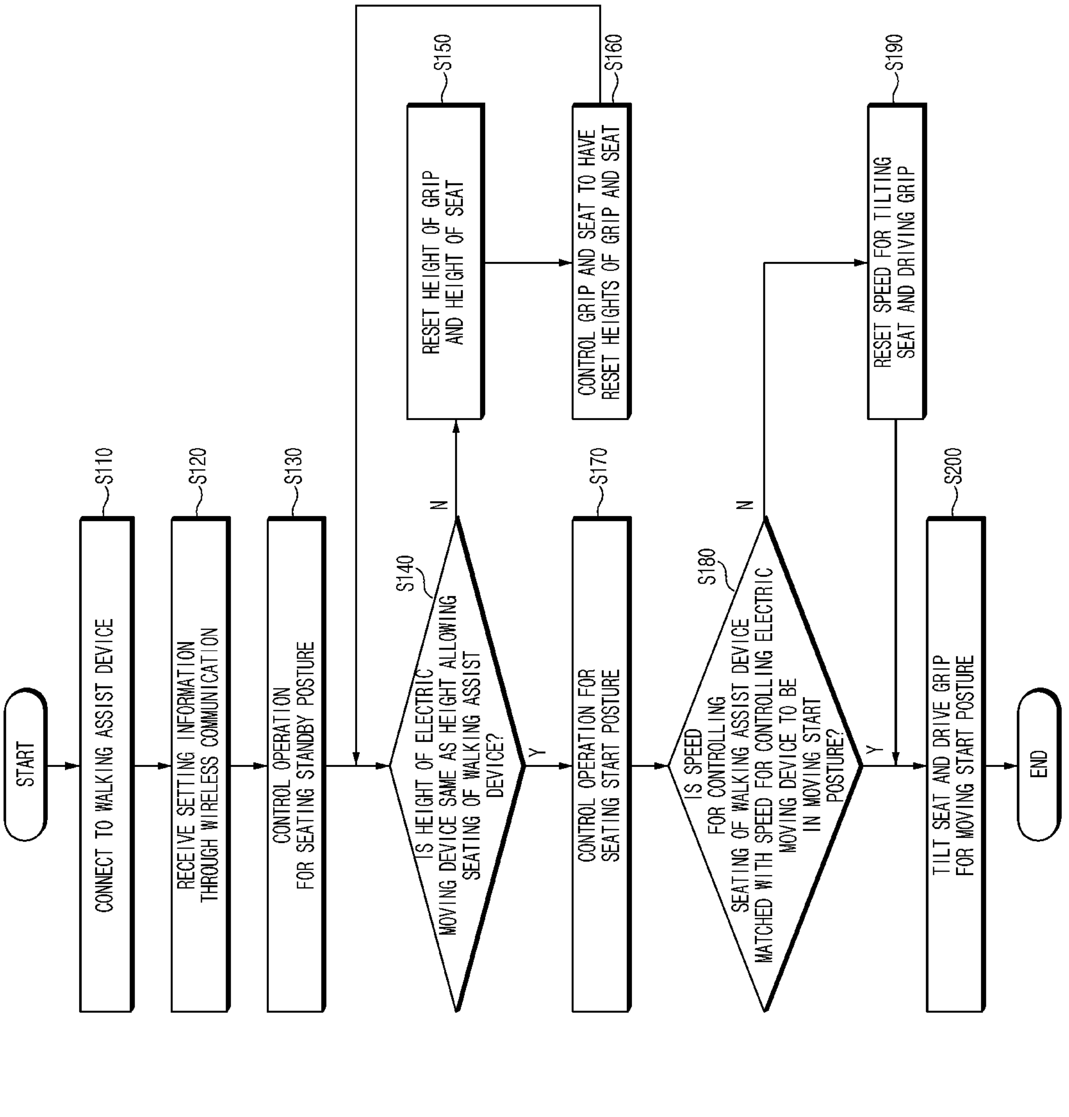
FIGS. 13 to 15 are flowcharts illustrating a method for controlling walking assist, according to an embodiment of the present disclosure.
Figure 14:
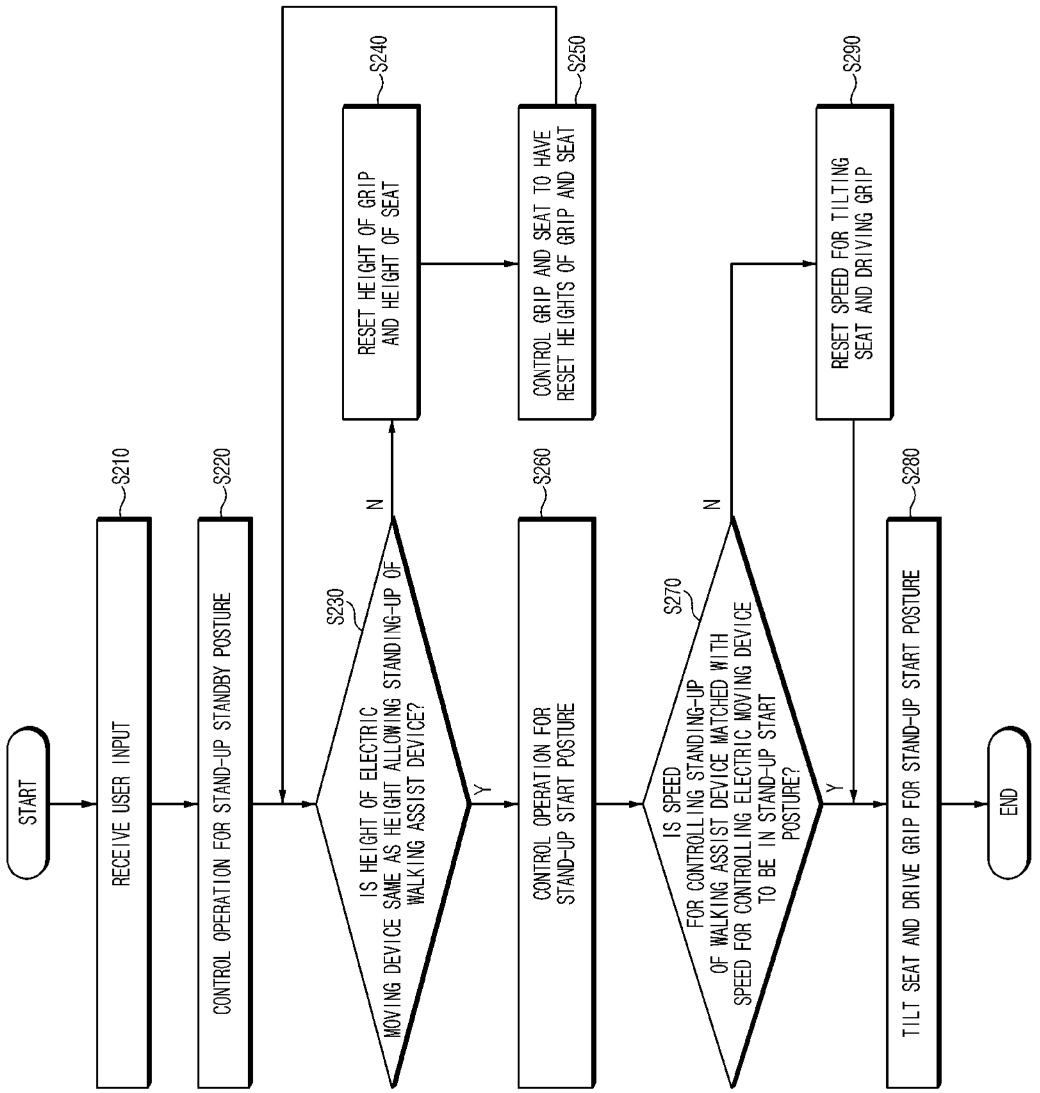
Figure 15:
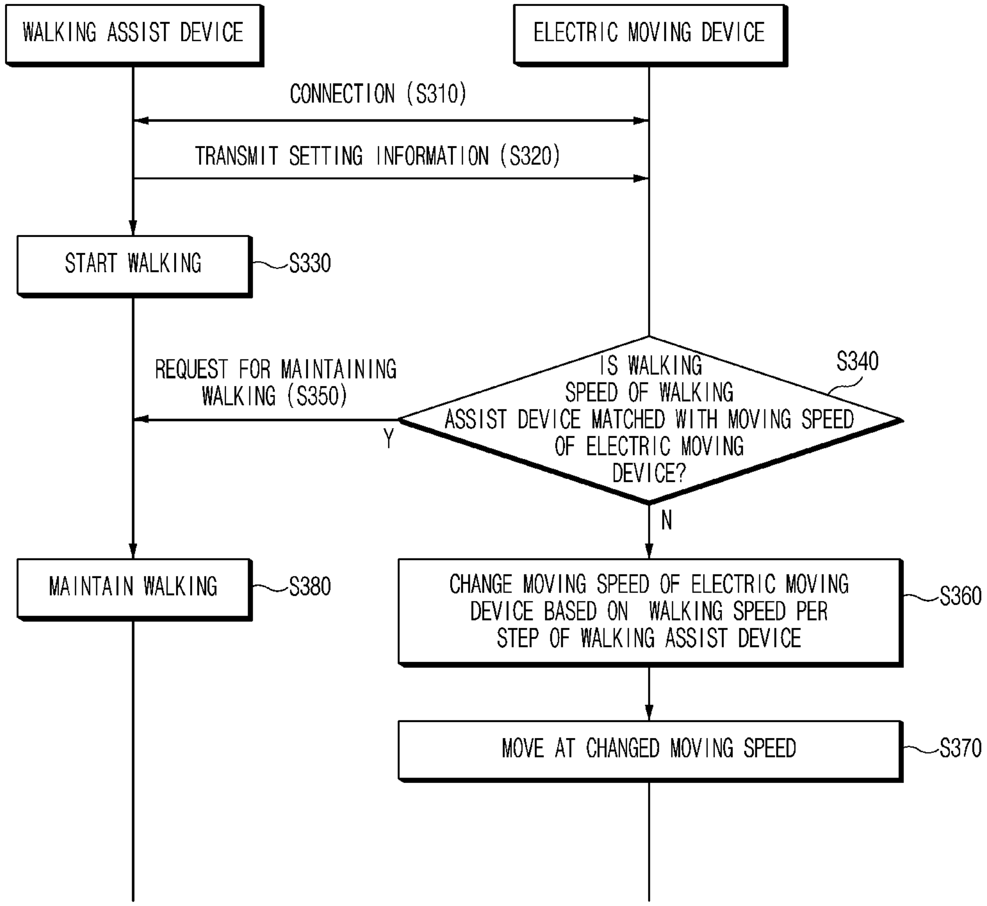

FIGS. 13 to 15 are flowcharts illustrating a method for controlling walking assist, according to an embodiment of the present disclosure.

As illustrated in FIG. 13, the electric moving device 300 may be connected to the walking assist device 200 through wireless communication (S110).

The electric moving device 300 may receive setting information from the walking assist device 200 through the wireless communication (S120).

The electric moving device 300 may perform a control operation for a seating standby posture (see FIG. 8), based on the setting information in the initial state of the electric moving device 300, when receiving the setting information (S130). In this case, the initial state may refer to the state of the grip 'G' and the seat 'S' of the electric moving device 300 before the grip 'G' and the seat 'S' are controlled based on the received setting information.

According to an embodiment, in S130, the electric moving device 300 may set the height 'H1' of the grip 'G' and the height 'H2' of the seat 'S', based on the length 230L of the first leg part 230, the length 240L of the second leg pall 240, and the length 250L of the third leg part 250, as illustrated in FIG. 8. For example, the electric moving device 300 may set the height of the grip 'G' to the sum of the length 230L of the first leg part 130, the length 240L of the second leg part 240, and the length 250L of the third leg part 250, and may control (drive) the grip 'G' to have the set height 'H1'. In addition, the electric moving device 300 may set the height 'H2' of the seat 'S' to the length 250L of the third leg pall 250 and may control (drive) the seat 'S' to have the set height 'H2' of the seat 'S', such that the electric moving device 300 is in the seating standby posture.

When performing the control operation for the seating standby posture, the electric moving device 300 may determine whether the height 'H1' of the grip 'G' and the height 'H2' of the seat 'S' are the heights allowing the seating of the walking assist device 200 (S140). According to an embodiment, in S140, the electric moving device 300 may determine whether the height 'H1' of the grip 'G' and the height 'H2' of the seat 'S' are the heights allowing the seating of the walking assist device 200, based on the length (leg length) of the walking assist device 200 or the body information of the user.

The controller 350 may reset the height 'H1' of the grip 'G' and the height 'H2' of the seat 'S' (S150) when determining the height 'H1' of the grip 'G' and the height 'H2' of the seat 'S' as being the heights not allowing the seating of the walking assist device 200 ('N') in S140. The controller 350 may control the grip 'G' and the seat 'S' to have the reset heights of the grip 'G' and the seat 'S' (S160). Accordingly, the controller 350 may continuously reflect information on the walking assist device 200 while controlling the electric moving device 300 to be in the optimal seating standby posture.

Meanwhile, the electric moving device 300 may perform a control operation for a seating start posture (see FIG. 9) (S170) when determining the height of the grip 'G' and the height of the seat 'S' as being the heights allowing the seating of the walking assist device 200 (Y) in S140.

According to an embodiment, as illustrated in FIG. 9, the electric moving device 300 may perform the control operation for the seating start posture by tilting the seat 'S' in S170, such that the walking assist device 200 easily takes the seat 'S' with the minimized impact when the walking assist device 200 takes the seat 'S'.

The electric moving device 300 may perform a control operation for a moving start posture, when the control operation for the seating start posture is completed. The electric moving device 300 may determine, for a control operation for a moving start posture, whether the speed for controlling the seating of the walking assist device 200 is matched with the speed (including a speed for moving down the grip 'G' and a speed for recovering the tilting of the seat 'S') for controlling the electric moving device 300 to be in the moving start posture (S180).

As illustrated in FIG. 10, the electric moving device 300 may control the grip 'G' to the height of the grip 'G' in the moving start posture and may control the tilting of the seat 'S' to be recovered (S200) when the speed for controlling the seating of the walking assist device 200 is matched with the speed for controlling the electric moving device 300 to be in the moving start posture (Y) in S180. In this case, the height 'H1' of the grip 'G' in the moving start posture may be the height of grip 'G' in the initial state.

Meanwhile, the electric moving device 300 may reset the speed (including a speed for moving down the grip 'G' and a speed for recovering the tilting of the seat 'S') for controlling the electric moving device 300 to be in the moving start posture to correspond to the speed for controlling the seating of the walking assist device 200 (S190) when the speed for controlling the seating of the walking assist device 200 is mismatched from the speed for controlling the electric moving device 300 to be in the moving start posture (N) in S180. For example, the electric moving device 300 may reset the speed for moving down the grip 'G' and the speed for recovering the tilting of the seat 'S' to correspond to the speed for controlling the seating of the walking assist device 200. In this case, the speed for moving down the grip 'G' may correspond to the speed for moving the second leg part 240 of the walking assist device 200 as the seat 'S' is tilted.

As illustrated in FIG. 14, the electric moving device 300 may receive a user input in the state that the electric moving device 300 is in the moving start posture (S210). The electric moving device 300 may perform a control operation for a stand-up standby posture (see FIG. 11) when the user input is received (S220). In this case, the user input may be interpreted as a user input for standing up.

For example, the electric moving device 300 may set the height of the grip 'G' to the sum of the length 230L of the first leg pall 130 and the length 250L of the third leg part 250 (see FIG. 5), and may control (drive) the grip 'G' to have the set height as illustrated in FIG. 11. In addition, the electric moving device 300 may set the height of the seat 'S' to the length 250L of the third leg part 250 and may control (drive) the seat 'S' to have the set height of the seat 'S' to perform the control operation for the stand-up standby posture in S220.

When performing a control operation for the stand-up standby posture, the electric moving device 300 may determine whether the height 'H1' of the grip 'G' and the height 'H2' of the seat 'S' are the heights allowing the standing-up of the walking assist device 200 (S230). According to an embodiment, in S230, the electric moving device 300 may determine whether the height 'H1' of the grip 'G' and the height 'H2' of the seat 'S' are the heights allowing the standing-up of the walking assist device 200, based on the length (leg length) of the walking assist device 200, or the body information of the user.

The electric moving device 300 may reset the height of the grip 'G' and the height of the seat 'S' (S240), when determining the height of the grip 'G' and the height of the seat 'S' as being the heights not allowing the standing-up of the walking assist device 200 ('N') in S230. The electric moving device 300 may control the grip 'G' and the seat 'S' to have the reset heights of the grip 'G' and the seat 'S' (S250). Accordingly, the electric moving device 300 may continuously reflect information on the walking assist device 200 while controlling the electric moving device 300 to be in the optimal stand-up standby posture.

Meanwhile, the electric moving device 300 may perform a control operation for a stand-up start posture (S260) when determining the height of the grip 'G' and the height of the seat 'S' as being the heights allowing the standing-up of the walking assist device 200 (Y) in S230. According to an embodiment, the electric moving device 300 may perform the control operation for the standing-up start posture by moving up the grip 'G' and tilting the seat 'S', such that the walking assist device 200 easily stands up, as illustrated in FIG. 12.

The electric moving device 300 may determine, for the control operation for the stand-up start posture, whether the speed for controlling the standing-up of the walking assist device 200 is matched with the speed (including a speed for moving up the grip 'G' and a speed for tilting the seat 'S') for controlling the electric moving device 300 to be in the stand-up start posture (S270).

The electric moving device 300 may control the grip 'G' to be moved up to the height of the grip in the stand-up start posture and may control the tilting of the seat 'S' (S280) as illustrated in FIG. 12 when the speed for controlling the standing-up of the walking assist device 200 is matched with the speed for controlling the electric moving device 300 to be in the stand-up start posture in S270. In this case, the height of the grip 'G' in the stand-up start posture may be set, based on the length 230L of the first leg part 230, the length 240L of the second leg part 240, and the length 250L of the third leg part 250. For example, the controller 350 may set the height of the grip 'G' to the sum of the length 230L of the first leg part 130, the length 240L of the second leg part 240, and the length 250L of the third leg part 250, and may control (drive) the grip 'G' to be moved up to the set height.

Meanwhile, the electric moving device 300 may reset the speed (driving speed) for controlling the electric moving device 300 to be in the stand-up start posture to correspond to the speed for controlling the standing-up of the walking assist device 200 (S290) when the speed for controlling the standing-up of the walking assist device 200 is mismatched from the speed for controlling the electric moving device 300 to be in the stand-up start posture in S270. For example, the electric moving device 300 may reset the speed for moving up the grip 'G' and the speed for tilting the seat 'S' to correspond to the speed for controlling the standing-up of the walking assist device 200. In this case, the speed for moving up the grip 'G' may correspond to the speed for moving the second leg part 240 of the walking assist device 200 as the seat 'S' is tilted.

As illustrated in FIG. 15, the electric moving device 300 may be connected to the walking assist device 200 through wireless communication (S310). The electric moving device 300 may receive setting information from the walking assist device 200 through the wireless communication (S320). According to an embodiment of the present disclosure, the electric moving device 300 may receive information on the length of the stride and the moving distance per second from the walking assist device 200 in S320.

The walking assist device 200 may start walking (S330), and the electric moving device 300 may determine whether the walking speed of the walking assist device 200 is matched with the moving speed (S340) when the walking assist device 200 starts walking.

The electric moving device 300 may request the walking assist device 200 to maintain the walking thereof (S350) when the walking speed of the walking assist device 200 is determined as being matched with the moving speed (Y) in S340. The walking assist device 200 may maintain walking (S380).

Meanwhile, the electric moving device 300 may change the moving speed, based on a walking speed per step of the walking assist device 200 (S360) and may perform a control operation to move at a changed speed (S370) when the walking speed of the walking assist device 200 is determined as being mismatched from the moving speed.

Accordingly, the electric moving device 300 may serve as a walker and may follow the walking assist device 200 when the walking assist device 200 walks.

Figure 16:
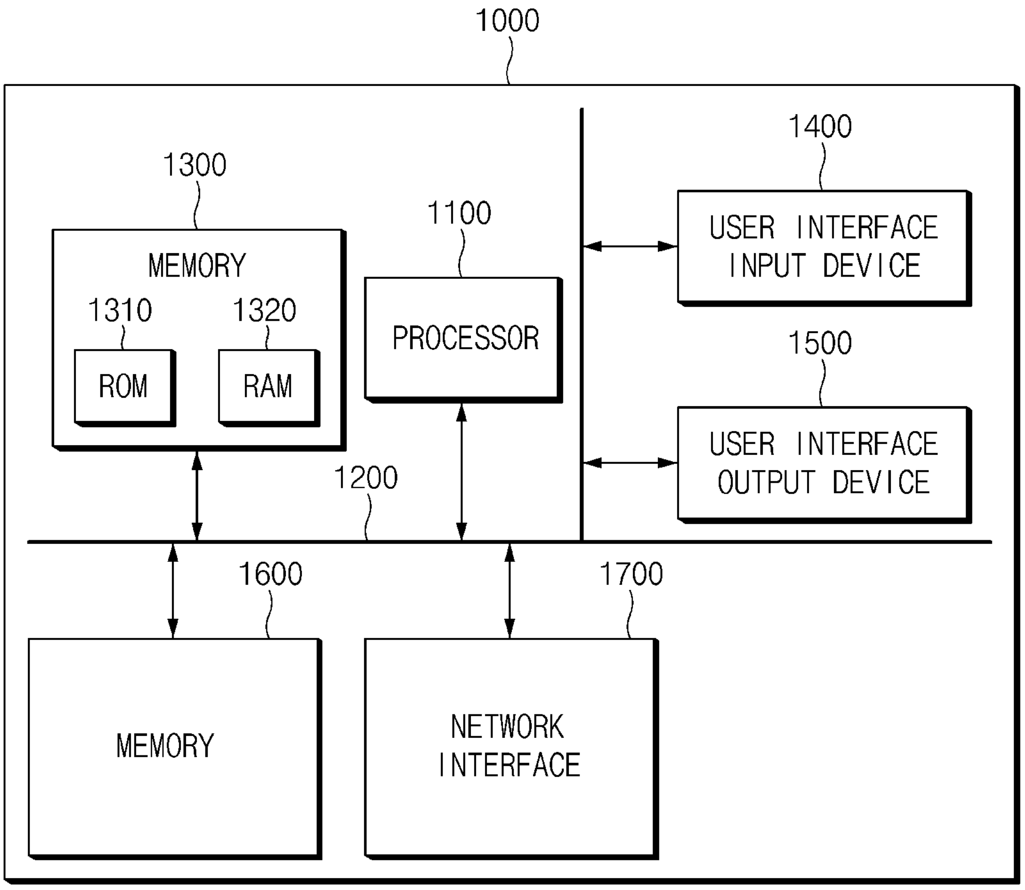
FIG. 16 is a block diagram illustrating a computing system to execute the method according to an embodiment of the present disclosure.

FIG. 16 is a block diagram illustrating a computing system to execute the method according to an embodiment of the present disclosure.

Referring to FIG. 16, a computing system 1000 may include at least one processor 1100, a memory 1300, a user interface input device 1400, a user interface output device 1500, a memory (i.e., a storage) 1600, and a network interface 1700, which are connected with each other via a bus 1200.

The processor 1100 may be a central processing unit (CPU) or a semiconductor device for processing instructions stored in the memory 1300 and/or the memory 1600. Each of the memory 1300 and the memory 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the memory 1600), such as a RAM, a flash memory, a ROM, an erasable and programmable ROM (EPROM), an electrically erasable and programmable ROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the system and the method for controlling walking assist, as the walking assist device and the electric moving device are integrally controlled, the patients in the walking assist device may get on or off the electric moving device. In addition, the speed of the electric moving device may be controlled to be matched with the operating speed of the walking assist device, thereby ensuring the convenience and the safety of the user.

The above description is merely an example of the technical ideas of embodiments of the present disclosure, and various modifications and changes may be made by one skilled in the art without departing from the essential characteristics of embodiments of the invention.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system comprising:

a walking assist device worn by a user; and an electric moving device configured to:

set a height of a grip of the electric moving device and a height of a seat of the electric moving device that allow seating of the walking assist device based on setting information received from the walking assist device; and set an operating speed of the electric moving device that corresponds to an operating speed of the walking assist device, wherein the grip is configured to move up or move down from a grip housing, wherein after a control operation for a seating start posture is completed, the electric moving device is configured to perform a control operation for a moving start posture in response to a seating of the walking assist device being completed, and wherein the electric moving device is configured to set a speed for moving down the grip corresponding to a speed for moving the walking assist device as the seat is tilted, so that the electric moving device sets a speed for controlling the electric moving device to be in the moving start posture corresponding to a speed for controlling the seating of the walking assist device.

2. The system of claim 1, wherein the walking assist device comprises:

an input device configured to receive the setting information from the user; and a controller configured to control a first leg part, a second leg part, and a third leg part.

3. The system of claim 2, wherein the electric moving device is configured to perform a control operation for a seating standby posture in response to receiving the setting information.

4. The system of claim 3, wherein the electric moving device is configured to:

set the height of the grip based on a length of the first leg part, a length of the second leg part, and a length of the third leg part; and set the height of the seat based on the length of the third leg part.

5. The system of claim 4, wherein the electric moving device is configured to determine whether the height of the grip and the height of the seat are heights that allow seating of the walking assist device during performance of the control operation for the seating standby posture.

6. The system of claim 5, wherein the electric moving device is configured to reset the height of the grip and the height of the seat in response to a determination that the height of the grip and the height of the seat are not the heights that allow the seating of the walking assist device.

7. The system of claim 5, wherein the electric moving device is configured to perform the control operation for the seating start posture in response to a determination that the height of the grip and the height of the seat are the heights that allow the seating of the walking assist device.

8. The system of claim 7, wherein the electric moving device is configured to perform the control operation for the seating start posture by tilting the seat to allow seating of the walking assist device.

9. The system of claim 2, wherein the electric moving device is configured to:

control the height of the grip to be matched with a sum of a length of the first leg part and a length of the third leg part; and recover a tilting of the seat to perform the control operation for the moving start posture.

10. The system of claim 2, wherein the electric moving device is configured to perform a control operation for a stand-up standby posture in response to a user input being made in a state that the electric moving device is in the moving start posture.

11. The system of claim 10, wherein the electric moving device is configured to:

set the height of the grip based on a length of the first leg part and a length of the third leg part; and set the height of the seat based on the length of the third leg part to perform the control operation for the stand-up standby posture.

12. The system of claim 11, wherein the electric moving device is configured to determine whether the height of the grip and the height of the seat are heights that allow standing-up of the walking assist device during performance of the control operation for the stand-up standby posture.

13. The system of claim 12, wherein the electric moving device is configured to reset the height of the grip and the height of the seat in response to a determination that the height of the grip and the height of the seat are not the heights that allow the standing-up of the walking assist device.

14. The system of claim 1, wherein the electric moving device is configured to reset a moving speed of the electric moving device based on a walking speed per step of the walking assist device in response to the moving speed of the electric moving device not being matched with the walking speed of the walking assist device.

15. The system of claim 1, wherein the electric moving device is configured to:

set the height of the grip of the electric moving device and the height of the seat of the electric moving device that allow the seating of the walking assist device based on body information of the user; and set a moving speed of the electric moving device to correspond to a walking speed of the walking assist device.

16. A device comprising:

a communication device configured to receive setting information of a user from a walking assist device; and a controller configured to:

set a height of a grip and a height of a seat that allow seating of the walking assist device based on the setting information; and set an operating speed of the device that corresponds to an operating speed of the walking assist device, wherein the grip is configured to move up or move down from a grip housing, wherein after a control operation for a seating start posture is completed, the device is configured to perform a control operation for a moving start posture in response to a seating of the walking assist device being completed, and wherein the device is configured to set a speed for moving down the grip corresponding to a speed for moving the walking assist device as the seat is tilted, so that the device sets a speed for controlling the device to be in the moving start posture corresponding to a speed for controlling the seating of the walking assist device.

17. A device comprising:

an input device configured to receive setting information of a user; and a controller configured to control operations of a first leg part, a second leg part, and a third leg part to assist walking of the user, as the device is worn by the user, wherein the device further comprises a communication device, wherein the communication device is configured to transmit the setting information to an electric moving device, wherein the electric moving device is configured to set a height of a grip and a height of a seat that allow seating of the device based on the setting information, wherein the grip is configured to move up and move down from a grip housing, wherein after a control operation for a seating posture is completed, the electric moving device is configured to perform a control operation for a moving start posture in response to a seating of the device being completed, and wherein the electric moving device is configured to set a speed for moving down the grip corresponding to a speed for moving the device as the seat is tilted, so that the electric moving device sets a speed for controlling the electric moving device to be in the moving start posture corresponding to a speed for controlling the seating of the device.

18. A method comprising:

setting a height of a grip and a height of a seat of an electric moving device that allow seating of a walking assist device worn by a user based on setting information received by the electric moving device from the walking assist device; and setting an operating speed of the electric moving device that corresponds to an operating speed of the walking assist device, wherein the grip is configured to move up or move down from a grip housing, wherein after a control operation for a seating start posture is completed, the electric moving device is configured to perform a control operation for a moving start posture in response to a seating of the walking assist device being completed, and wherein the electric moving device is configured to set a speed for moving down the grip corresponding to a speed for moving the walking assist device as the seat is tilted, so that the electric moving device sets a speed for controlling the electric moving device to be in the moving start posture corresponding to a speed for controlling the seating of the walking assist device.

19. The method of claim 18, further comprising:

setting a height of the grip based on a length of a first leg part, a length of a second leg part, and a length of a third leg part.

20. The method of claim 18, further comprising:

setting the grip up to a height matching a sum of a first leg part length and a third leg part length.

* * * * *